(12) United States Patent
Apthorpe

(10) Patent No.: US 8,764,061 B2
(45) Date of Patent: Jul. 1, 2014

(54) STAND

(71) Applicant: Open Door Solutions Pty Ltd, Cromer (AU)

(72) Inventor: Jason Paul Apthorpe, Cromer (AU)

(73) Assignee: Open Door Solutions Pty Ltd, Cromer, New South Wales (AU)

( * ) Notice: Subject to any disclaimer, the term of this patent is extended or adjusted under 35 U.S.C. 154(b) by 0 days.

(21) Appl. No.: 13/851,451

(22) Filed: Mar. 27, 2013

(65) Prior Publication Data

US 2013/0270807 A1      Oct. 17, 2013

(30) Foreign Application Priority Data

Mar. 27, 2012    (AU) ................................. 2012100342

(51) Int. Cl.
*B62H 1/02*      (2006.01)
(52) U.S. Cl.
USPC ................................... 280/763.1; 280/87.021
(58) Field of Classification Search
USPC .............................. 280/87.01, 87.021, 87.041
See application file for complete search history.

(56) References Cited

U.S. PATENT DOCUMENTS

| | | | | |
|---|---|---|---|---|
| 1,342,688 A | * | 6/1920 | Millward et al. | 280/259 |
| 1,615,403 A | * | 1/1927 | Prochaska | 280/87.021 |
| 2,180,143 A | * | 11/1939 | Fletcher | 280/87.041 |
| 2002/0093164 A1 | | 7/2002 | Tai | |
| 2009/0051134 A1 | * | 2/2009 | Clugston | 280/87.041 |

FOREIGN PATENT DOCUMENTS

| | | |
|---|---|---|
| DE | 437577 C1 | 11/1996 |
| GB | 0471009 A | 8/1937 |
| JP | 5919783 U | 2/1984 |

OTHER PUBLICATIONS

GB1305584.3 Search Report, Jun. 24, 2013.

* cited by examiner

*Primary Examiner* — J. Allen Shriver, II
*Assistant Examiner* — Bridget Avery
(74) *Attorney, Agent, or Firm* — Dority & Manning, P.A.

(57) ABSTRACT

A stand assembly (1) to be attached to a personal transport device (100). The device (100) including a base and at least one axle (104). The axle (104) being adapted to support at least one wheel (108). The wheel being adapted to assist movement of said device along a surface. The assembly to be located in use adjacent a centre of mass (XX) of said device and including a pair of arms (5) extending generally parallel to each other and longitudinally towards a bridging member (7) to define a "U" shape. Each arm (5) includes a hole (10) at a free end to engage the axle in use to permit movement of the arms about the axle between a use position and a stored position.

8 Claims, 5 Drawing Sheets

STAND

TECHNICAL FIELD

The present invention relates to a stand and in particular to a stand for a personal transport device.

BACKGROUND ART

Various personal transport devices are known such as bicycles, motor cycles, scooters, tricycles, skateboards, Segways™, or the like. Such personal transport devices have become popular due to their cost effectiveness, environmental cleanliness and ease of parking and use around congested cities. Smaller child friendly versions have also become popular with the younger generation in that they can be a lot of fun. Such devices typically include a deck or base located between a pair of axles. The axles typically support one or more wheels. It has been known to put a brake or stand adjacent the rear wheel(s).

The problem with existing personal transport devices is that the majority of weight is positioned towards the front of the device. This creates a problem when braking or standing in place, particularly if held from the rear of the device. For example, when you secure the rear of a bicycle in a stand, as the front is heavier and rotates about an axes, the bike/scooter tends to fall over. Accordingly, there is a need for a stand for a personal transport device which can be positioned at the front of the device where the majority of weight is distributed.

OBJECT OF INVENTION

It is an object of the present invention to substantially overcome or at least ameliorate one or more of the disadvantages of the prior art, or to at least provide a useful alternative.

SUMMARY OF INVENTION

There is disclosed herein a stand assembly to be attached to a personal transport device, said device including a base and at least one axle, said axle being adapted to support at least one wheel, said wheel being adapted to assist movement of said device along a surface;

the assembly to be located in use adjacent a centre of mass of said device and including a pair of arms extending generally parallel to each other and longitudinally towards a bridging member to define a "U" shape;

each said arm including a hole at a free end remote said bridging member and adapted to engage said axle in use to permit movement of said arms about said axle between a use position and a stored position;

whereby in a use position said assembly inhibits said device from moving along said surface and in a stored position said assembly permits movement of said device along said surface, the assembly further including a locking plate operatively associated with said axle and said arms and including retaining means to hold said assembly in said stored position.

Preferably, the stand assembly includes at least one mount to connect said assembly to said device.

Preferably, the retaining means includes a pair of magnets operatively associated with each other to hold the assembly in said stored position.

Preferably, one magnet is secured to an arm and one magnet is secured to said locking plate.

Preferably, the locking plate includes a hole corresponding to the holes of said arms and adapted to receive said axle in use.

Preferably, the bridging member includes at least one foot adapted to raise said wheel of said device away from said surface in use to inhibit said device from moving along said surface.

BRIEF DESCRIPTION OF DRAWINGS

A preferred embodiment of the present invention will now be described, by way of an example only, with reference to the accompanying drawings wherein.

DESCRIPTION OF EMBODIMENTS

Figure 1:
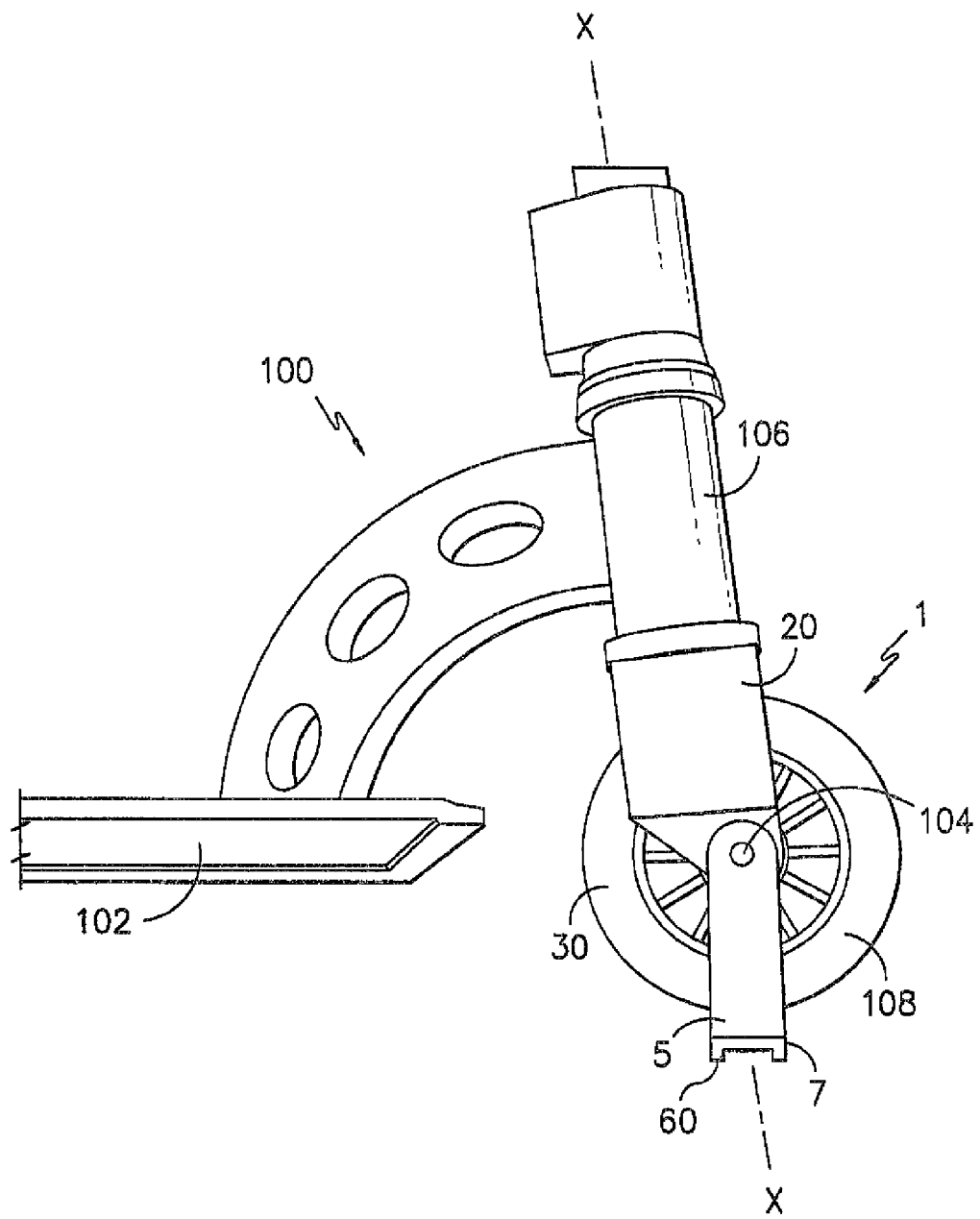
FIG. 1 is a cut-away front side view of a personal transport device having a stand of an embodiment of the present invention.

There is schematically depicted in the drawings, a stand 1 to be attached to a personal transport device 100 such as a bicycle, motor cycle, scooter, skateboard or the like. The device 100 includes a base 102 for a user to stand upon and at least one axle 104. The assembly 1 is adapted to be located adjacent the centre of mass which in FIG. 1 is located along axis XX which is in line with the front shaft 106 of the device 100 and which extends to the handles (not shown). In this embodiment, a scooter is shown. The axle 104 is adapted to support at least one wheel 108. The wheel 108 is adapted to assist movement of the device 100 along a surface (not shown). As better seen in FIGS. 3a, 3b and 4a, 4b, 4c, the device 100 includes a stand assembly 1 to be attached to an axle 104 so that in a use position (see FIGS. 1 and 2) the stand assembly 1 inhibits the device 100 from moving along the surface by raising the wheel 108 above the surface and in a stored position (not shown) the stand assembly 1 permits the wheel 108 to rotate freely about the axle 104 and along a surface. These positions can also be thought of as a ride position where a user is riding the device and a park position where the device (scooter) is stationary.

Figure 3A:
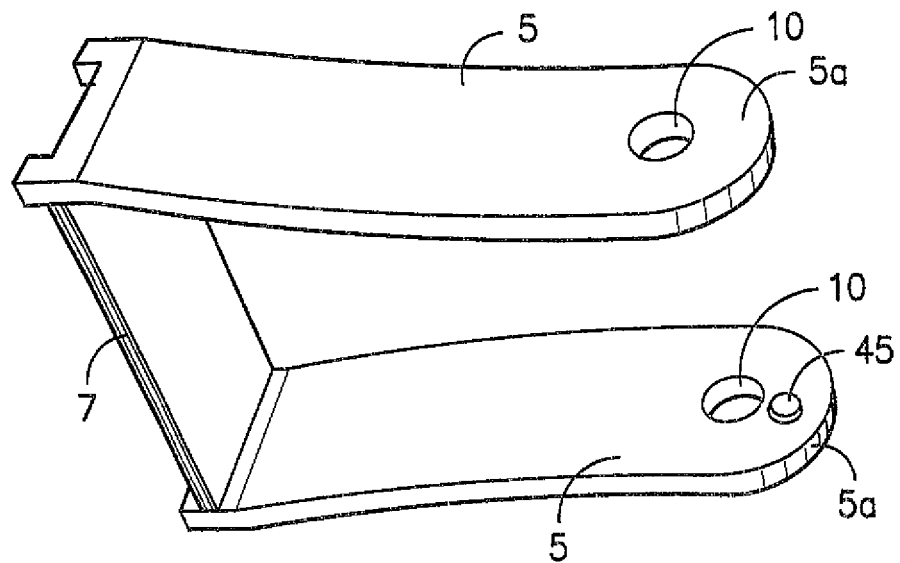
FIGS. 3a and 3b are parts exploded views of an embodiment of the present invention.
Figure 3B:
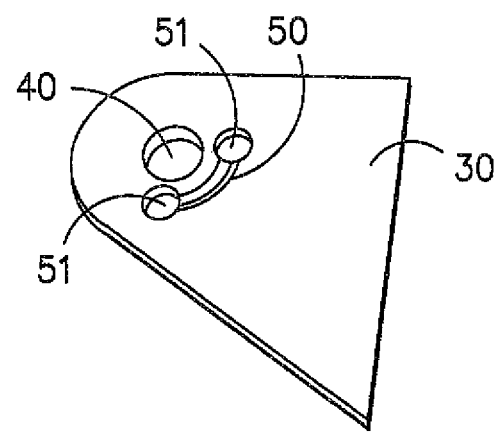
Figure 4A:
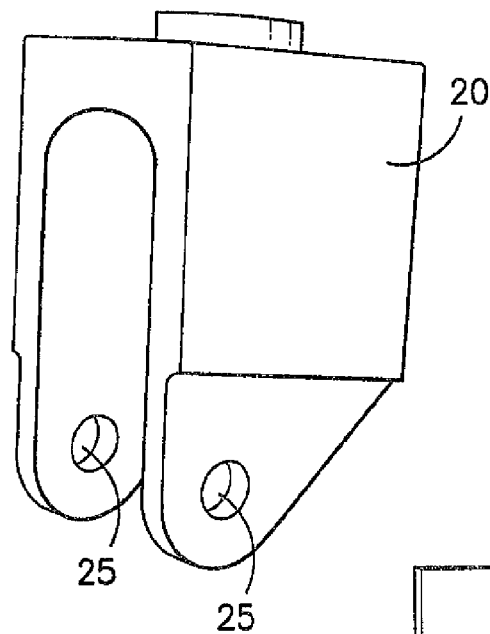
FIGS. 4a, 4b and 4c are parts exploded views of an embodiment of the present invention.
Figure 4B:
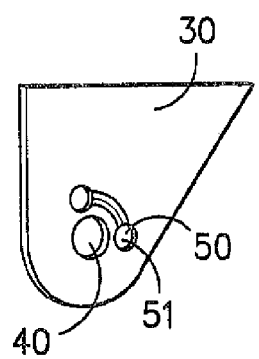
Figure 4C:
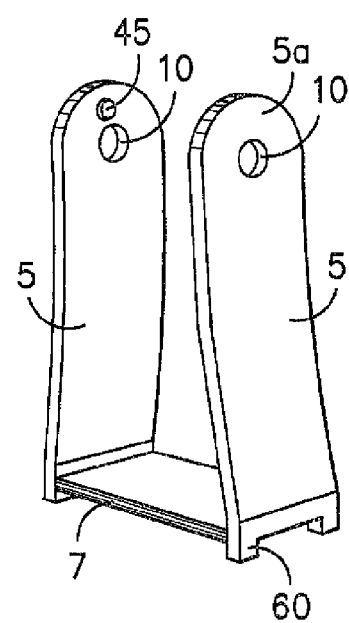
Figure 5:
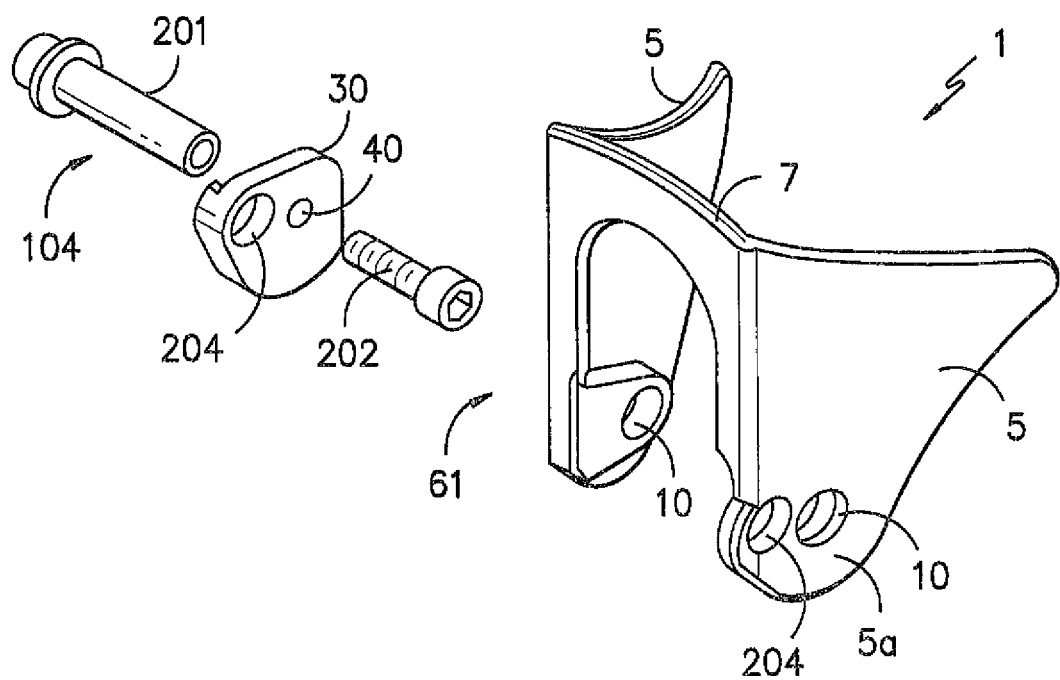
FIG. 5 is a parts exploded view of an alternate embodiment of the present invention.

The stand assembly 1 includes a pair of arms 5 generally parallel to each other and extending longitudinally away from a bridging member 7. Bridging member 7 extends between the arms 5 to define a generally U-shaped assembly as best seen in FIGS. 3a and 4c. It should however be understood that different shapes could be utilised, for example, a triangle, semi-circle or the like. The arms 5 at a free end 5a include recesses, holes or the like 10 to receive the axle 104 in use and to permit movement of the arms 5 and thereby the stand assembly 1 about the axle 104 to permit movement of the stand assembly 1 between a use position and a stored position. One or more bearings or the like could be located within the holes 10. The axle 104 could be the existing axle 104 of the device 100 or a modified axle 104 as shown in FIG. 5 and discussed below. The stand assembly 1 can further include a mount 20 (as best seen in FIG. 4a) to connect the device 100 to the axle 104, if required. The mount 20 having complimentary recesses, holes or the like 25 that correspond to the holes 10 of the arms 5. The holes 10, 25 being aligned with the axle 104 in use. To assist with movement and locking of the stand assembly 1 about the axle 104, a plate or bush 30 (as best seen in FIGS. 3b and 4b) can be positioned between the mount 20 and arms 5. The plate 30 can include complimentary holes 40 to align with the holes 10, 25 and the axle 104. The assembly 1 can also include retaining means such as a latch, catch (utilising a slot and protrusion arrangement for example), magnet (see FIG. 5), hook or the like to retain the stand assembly 1 in various positions with respect to the device front shaft 106. The retaining means could cause snap locking engagement of the assembly 1 in the stored and/or use positions. For example, in one embodiment, the arms 5 at the free end 5a can include at least one guide protrusion 45 extending from the arms 5 towards the plate 30 and operatively associated with a corresponding guide slot 50 on the plate 30 as best seen in FIGS. 3b and 4b. In an alternate embodiment, the guide protrusion 45 can be a slot and the guide slot 50 a protrusion. The guide protrusion 45 could be fixed extending away from the plate 30 or could include a spring loaded mechanism (not shown) so that it can move perpendicular to the hole. The guide slot 50 can be of any length, depth or shape and could for example be arcuate over a 90 to 180 degree angle. The guide slot 50 could also include one or more recesses 51 to allow the protrusion 45 to move along and lock or snap in various positions along the guide slot 50. This action will permit the stand assembly 1 to be locked in various positions with respect to the device 100 and in particular the front shaft 106. The stand assembly 1 could also include feet 60 adapted to further raise the wheel 108 away from the surface in use to further inhibit the device 100 from moving along the surface.

In the embodiment of the invention shown in FIG. 5, a further stand assembly 1 is shown. In this embodiment the arms 5 are of a "wing" shape and the bridging portion 7 includes a panel 61 to receive a logo or the like. At the free end 5a of the arms 5 two holes are located. The first hole 10 is aligned on each wing 5 and is adapted to connect with the axle 104 of a personal transport device 100. In this case, the axle 104 is composed of two interlocking shafts 201, 202. The shafts 201, 202 can be threadingly engaged, snap lockingly engaged or the like. The second hole 204 is for receipt of a magnet (not shown). In FIG. 5, the plate 30 also includes a hole 204 adapted to receive a magnet. In use the magnets located in the holes 204 of the arm 5 and plate 30 are operatively associated with each other to hold the stand assembly 1 in a stored position where the bridging member 7 is located adjacent the device front shaft 106. There could however be more than two magnets to permit the stand to be locked in various locations along an arc created by the strand 1 rotating about the axle 104. For example, a third magnet (not shown) or metal disc can be utilised to secure the assembly 1 in the park position. This ensures that when the stand drops down to a park position it doesn't over rotate but it engages a third magnet, steel disc or stop member. To install the stand assembly 1 of FIG. 5 the arms 5 are flexed away from each other at their free end 5a, placed about the wheel 108 and snap lockingly engaged onto the axle 104. A user can simply "kick" the stand 1 upwardly into the stored position.

Figure 2:
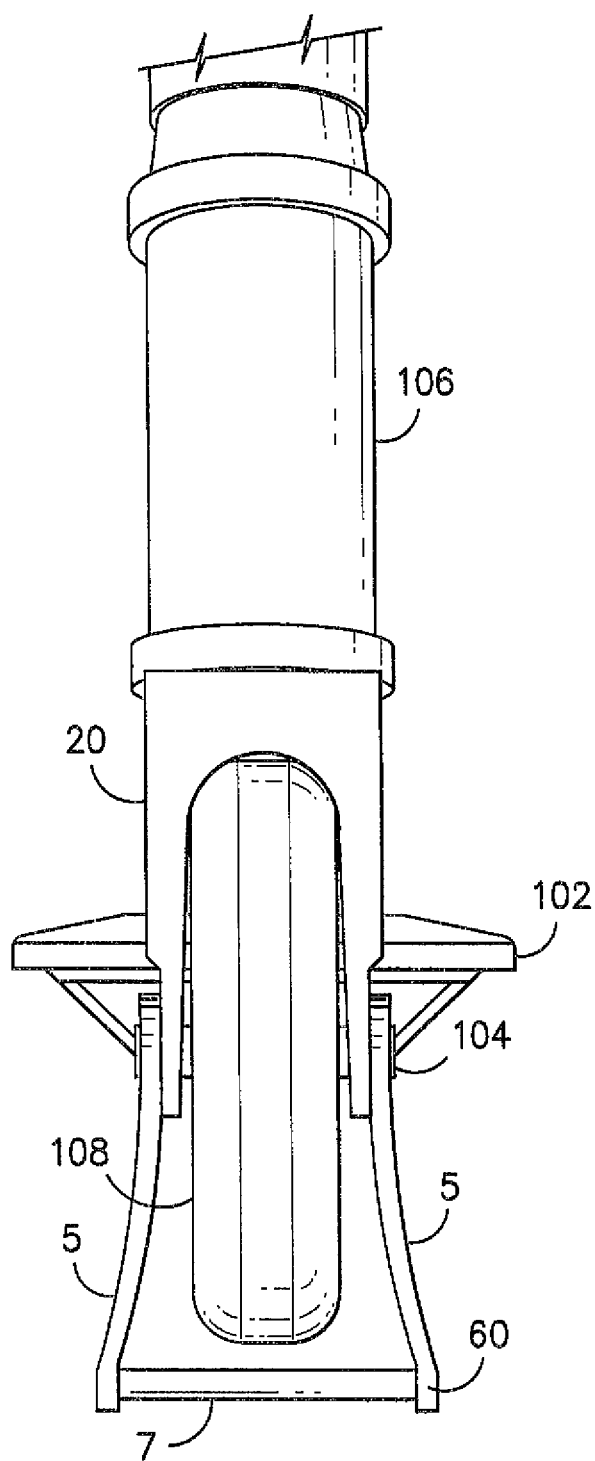
FIG. 2 is a front view of FIG. 1.

Though the drawings of FIGS. 1 and 2 show a "scooter" type device 100, it should be understood that the stand 1 could be utilised with any type of personal transport device. It should also be understood that the present invention in at least a preferred form provides a stand 1 located at or adjacent the centre of mass (gravity) of the device 100 providing a much more effective stand than existing systems.

Further, the stand 1 could include attachment means (not shown) on the mount 20, arms 5 and/or plate 30 to secure a character or ornament such as a skull, pirate, soldier, fairy, princess, flames, waves, bones, flowers and tattoo-like swirls, animal, or the like to stylise the personal transport device 100. Such character attachments in a preferred form would be releasably attachable and interchangeable and secured by way of fastening means, such as snap locking, Velcro™, and could be in the form. The characters could also be integrally formed with the components of the stand assembly 1. For example, the stand assembly 1 could include a pair of plates 30, positionable adjacent each arm 5 on each side of the mount 20. The pair of plates 30 could have a corresponding bridging portion (not shown). The bridging portion of the plates 30 having a surface for a character to be attached either releasably or integrally.

Although the invention has been described with reference to specific examples, it will be appreciated by those skilled in the art that the invention may be embodied in many other forms.

The invention claimed is

1. A stand assembly to be attached to a personal transport device, said device including a base and at least one axle, said axle being adapted to support at least one wheel, said wheel being adapted to assist movement of said device along a surface;
    the assembly to be located in use adjacent a centre of mass of said device and including a pair of arms extending generally parallel to each other and longitudinally towards a bridging member to define a "U" shape;
    each said arm including a hole at a free end remote said bridging member and adapted to engage said axle in use to permit movement of said arms about said axle between a use position and a stored position;
    whereby in a use position said assembly inhibits said device from moving along said surface and in a stored position said assembly permits movement of said device along said surface, the assembly further including a locking plate operatively associated with said axle and said arms and including retaining means to hold said assembly in said stored position;
    wherein the retaining means include a pair of magnets operatively associated with each other to hold the assembly in said stored position, whereby one magnet is secured to an arm and one magnet is secured to said locking plate.

2. The stand assembly according to claim 1, including at least one mount to connect said assembly to said device.

3. The stand assembly according to claim 1, wherein the locking plate includes a hole corresponding to the holes of said arms and adapted to receive said axle in use.

4. The stand assembly according to claim 3, wherein the bridging member includes at least one foot adapted to raise said wheel of said device away from said surface in use to inhibit said device from moving along said surface.

5. A stand assembly to be attached to a personal transport device, said device including a base and at least one axle, said axle being adapted to support at least one wheel, said wheel being adapted to assist movement of said device along a surface;
    the assembly to be located in use adjacent a centre of mass of said device and including a pair of arms extending generally parallel to each other and longitudinally towards a bridging member to define a "U" shape;
    each said arm including a hole at a free end remote said bridging member and adapted to engage said axle in use to permit movement of said arms about said axle between a use position and stored position;
    whereby in a use position said assembly inhibits said device from moving along said surface, the assembly further including a locking plate operatively associated with said axle and said arms and including retaining means to hold said assembly in said stored position;

wherein the retaining means include a pair of magnets operatively associated with each other to hold the assembly in said stored position.

6. The stand assembly according to claim 5, including at least one mount to connect said assembly to said device.

7. The stand assembly according to claim 5, wherein the locking plate includes a hole corresponding to the holes of said arms and adapted to receive said axle in use.

8. The stand assembly according to claim 5, wherein the bridging member includes at least one foot adapted to raise said wheel of said device away from said surface in use to inhibit said device from moving along said surface.

* * * * *